United States Patent
Mortensen

(10) Patent No.: US 7,239,848 B2
(45) Date of Patent: Jul. 3, 2007

(54) METHOD OF TRANSMITTING SIGNALS BETWEEN AN ADAPTIVE ANTENNA OF A BASE STATION AND A MOBILE USER EQUIPMENT IN A TELECOMMUNICATION NETWORK

(75) Inventor: Ivar Mortensen, Stuttgart (DE)

(73) Assignee: Alcatel, Paris (FR)

( * ) Notice: Subject to any disclaimer, the term of this patent is extended or adjusted under 35 U.S.C. 154(b) by 685 days.

(21) Appl. No.: 10/307,457

(22) Filed: Dec. 2, 2002

(65) Prior Publication Data
US 2003/0104837 A1 Jun. 5, 2003

(30) Foreign Application Priority Data
Dec. 3, 2001 (EP) ................................... 01440409

(51) Int. Cl.
*H04B 17/00* (2006.01)
(52) U.S. Cl. .................. 455/67.1; 455/500; 455/456.1; 455/561
(58) Field of Classification Search ............. 455/67.16, 455/67.11, 67.13, 456.1, 456.2, 456.6, 457, 455/67.1, 426.1, 500, 561, 422.1, 423, 424
See application file for complete search history.

(56) References Cited
U.S. PATENT DOCUMENTS

| 5,592,490 | A | | 1/1997 | Barratt et al. | |
|---|---|---|---|---|---|
| 5,960,341 | A | * | 9/1999 | LeBlanc et al. | 455/426.1 |
| 6,021,334 | A | | 2/2000 | Aste et al. | |
| 6,442,393 | B1 | * | 8/2002 | Hogan | 455/456.5 |
| 6,963,742 | B2 | * | 11/2005 | Boros et al. | 455/424 |
| 2002/0098838 | A1 | * | 7/2002 | Ikeda et al. | 455/423 |
| 2004/0204099 | A1 | * | 10/2004 | Dam et al. | 455/561 |
| 2004/0266360 | A1 | * | 12/2004 | Hamalainen et al. | 455/67.16 |

FOREIGN PATENT DOCUMENTS

| EP | 1067710 A1 | 1/2001 |
|---|---|---|
| WO | WO 9745968 | 12/1997 |

* cited by examiner

*Primary Examiner*—Charles Appiah
*Assistant Examiner*—Joy Contee
(74) *Attorney, Agent, or Firm*—Sughrue Mion, PLLC

(57) ABSTRACT

A telecommunication system is described for transmitting signals between an adaptive antenna of a base station and a mobile user equipment. At least one uplink parameter of a signal received by the base station is calculated. The uplink parameter relates to a specific location of the mobile user equipment. At least one downlink parameter of a signal sent by the base station is evaluated. Said downlink parameter relates to the same specific location of the mobile user equipment. Said uplink parameter and said corresponding downlink parameter are stored in the base station.

9 Claims, 1 Drawing Sheet

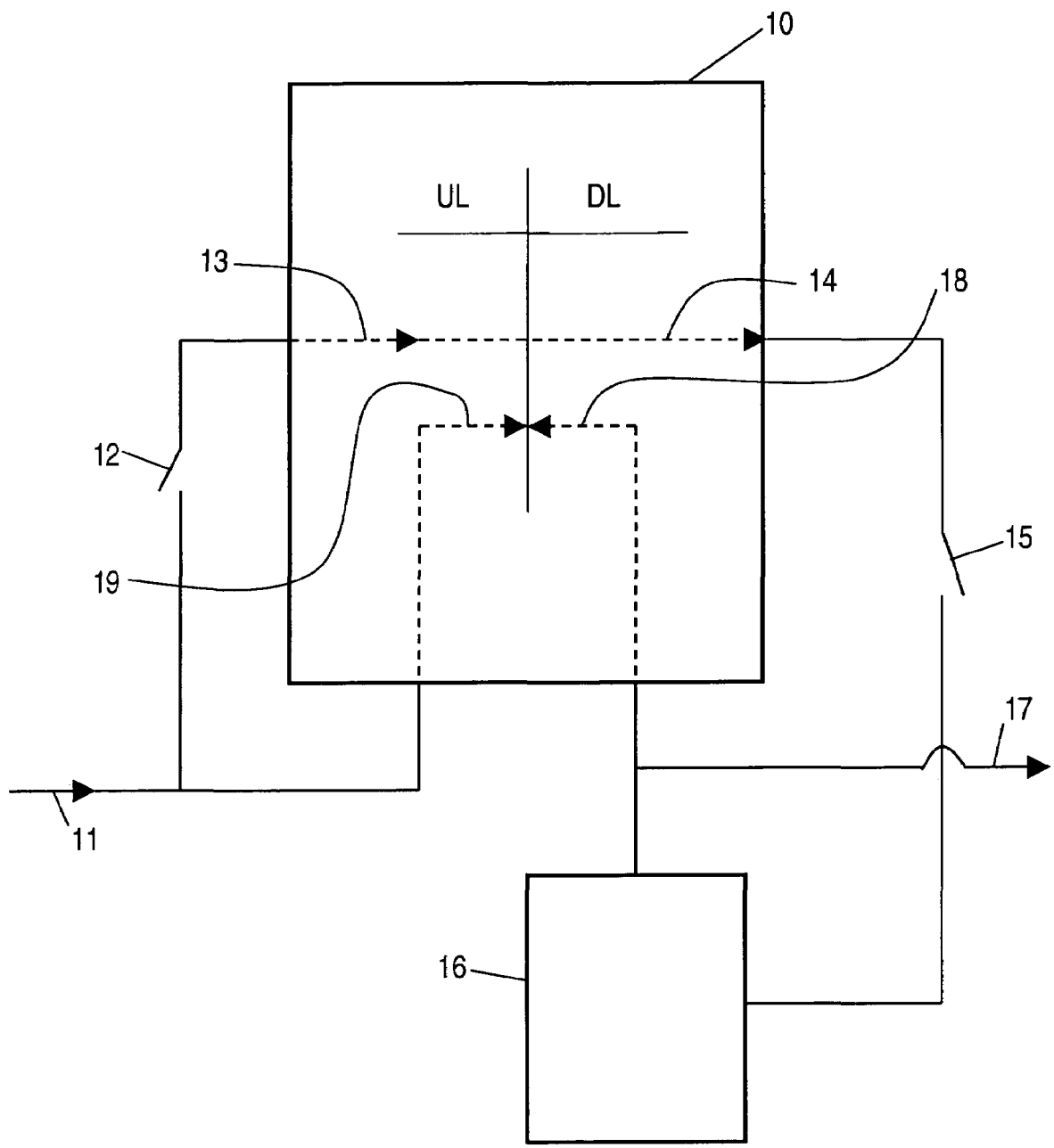

METHOD OF TRANSMITTING SIGNALS BETWEEN AN ADAPTIVE ANTENNA OF A BASE STATION AND A MOBILE USER EQUIPMENT IN A TELECOMMUNICATION NETWORK

BACKGROUND OF THE INVENTION

The invention relates to a method of transmitting signals between an adaptive antenna of a base station and a mobile user equipment in a telecommunication network.

In an Universal Mobile Telecommunication System (UMTS), a base station communicates with one or more mobile user equipments. The base station comprises an adaptive antenna which sends data to the user equipment in a so-called downlink and receives data from the user equipment in a so-called uplink.

The adaptive antenna comprises two or more antenna elements.

In the uplink from a specific mobile user equipment, the base station receives several signals from the adaptive antenna. Each one of the signals is weighted with a complex factor. Then, the weighted signals are accumulated in order to create an uplink signal which is further processed within the base station. As an example, the complex factor may relate to the amplitude and the phase of the respective received signal.

The complex factors are determined by a so-called uplink adaptive antenna function. The complex factors are calculated such that an optimal uplink signal is created. The optimum of the uplink signal may be seen in the sense of an optimal signal-to-interference ratio of the created uplink signal. However, also other criteria for an optimal uplink signal may be selected.

The uplink adaptive antenna function has the further task to keep the complex factors optimal over the duration of a communication. For that purpose, the complex factors are calculated e.g. a few times per second.

The calculation of the complex factors can be carried out by the base station without any feedback or the like. A number of algorithms are known in the prior art to calculate the complex factors. As well, algorithms are known to determine an approximate direction of the specific mobile user equipment in respect to the base station based on the calculated complex factors.

For example, a closed loop power control algorithm may be used in the uplink to adjust the signal-to-interference ratio of the signal received from a specific mobile user equipment to a given target value.

In the downlink to a specific mobile user equipment, the base station creates a downlink signal which is forwarded to the two or more antenna elements of the adaptive antenna. Each one of the two or more antenna elements weights the downlink signal with a complex factor. Then, the weighted signals are sent out by the two or more antenna elements of the adaptive antenna. Again, the complex factor may relate to the amplitude and the phase of the respective signal.

The weighting of the signals sent out by the two or more antenna elements of the adaptive antenna allows to adjust the beam of the adaptive antenna into the direction of the specific mobile user equipment.

The complex factors are determined by a so-called downlink adaptive antenna function.

The complex factors are calculated such that signals sent out by the two or more antenna elements of the adaptive antenna are optimal. The optimum of these signals may be seen in the sense of an optimal signal-to-interference ratio of the signal received by the mobile user equipment. However, also other criteria for an optimal downlink signal may be selected.

The downlink adaptive antenna function has the further task to keep the complex factors optimal over the duration of a communication. For that purpose, the complex factors are calculated e.g. a few times per second.

The calculation of the complex factors is carried out by the base station. However, in the case of a dependency of the complex factors from the signal-to-interference ratio of the signal received by the mobile user equipment, some kind of feedback from the mobile user equipment is necessary. A possible algorithm to calculate the complex factors is described in EP 1 067 710 A1.

A problem occurs in the downlink when a new mobile user equipment is turned on. In this situation, the base station does not know the location of the new mobile user equipment so that an adjustment of the beam of the adaptive antenna into the direction of the new user equipment is not possible.

This situation may be solved as follows:

It is possible to "start" the adjustment of the beam of the adaptive antenna with a very broad range of the used complex factors. Then, these complex factors may be optimized according to EP 1 067 710 A1. However, this procedure has the disadvantage that the quality of the downlink signal received in the new mobile user equipment during the "start" of the adjustment might be low.

If the adaptive antenna for the uplink and the adaptive antenna for the downlink are identical, then it is possible to use the fact that the direction of the new user equipment in respect to the base station is known from the first transmission in the uplink. As described, the base station calculates complex factors of the uplink signal received by the adaptive antenna which, among others, may correspond to the direction of the specific user equipment in respect to the base station. These complex factors of the uplink may then be used to derive those complex factors of the downlink which also correspond to the direction of the new user equipment.

If the uplink and the downlink use the identical carrier frequency, then, the complex factors calculated from the uplink may be identically used for the downlink.

However, as it is the case for UMTS, if the uplink and the downlink use different carrier frequencies, then the complex factors of the uplink can only be used for the downlink if the signal paths of the uplink and the downlink are calibrated.

However, the calibration of signal paths is very complex and expensive and has to be carried out regularly e.g. due to temperature changes or aging.

Another problem occurs in the uplink. As described, the complex factors are determined by the uplink adaptive antenna function such that an optimal uplink signal is created. However, it is possible that the uplink adaptive antenna function does not—for whatever reason—detect the absolute optimum but only a local optimum. As a result, the created uplink signal is not optimal.

SUMMARY OF THE INVENTION

The object of the invention is to provide a method of transmitting signals between an adaptive antenna of a base station and a mobile user equipment in a telecommunication network which overcomes the above and other problems.

The invention solves this object by a method of transmitting signals between an adaptive antenna of a base station and a mobile user equipment in a telecommunication network, comprising the steps of calculating at least one uplink parameter of a signal received by the base station wherein the uplink parameter relates to a specific location of the mobile user equipment, evaluating at least one downlink parameter of a signal sent by the base station wherein said downlink parameter relates to the same specific location of the mobile user equipment, and storing said uplink parameter and said corresponding downlink parameter in the base station.

The invention also solves this object by a corresponding telecommunication network, by a base station for such a telecommunication network and by a mobile user equipment for such a telecommunication network.

The stored corresponding uplink and downlink parameters may be used as some kind of calibration of the adaptive antenna. In particular, the stored corresponding uplink and downlink parameters may be used to create a downlink signal without a complex and expensive calibration. As well, the stored corresponding uplink and downlink parameters may be used vice versa, i.e. to check the correctness of an uplink or downlink signal.

An advantageous embodiment of the invention comprises the step of selecting a stored downlink parameter depending on the uplink parameter wherein the uplink parameter is calculated from the signal received from a new mobile user equipment, and using the selected downlink parameter as a starting point for a further adaption of the selected downlink parameter.

With the help of the stored uplink and downlink parameters, it is possible to select a downlink parameter for a new user equipment which may be used as a starting point for a further adaption of this downlink parameter. The selected downlink parameter has the advantage that it does not have a very broad range so that the resulting quality of the sent signals is not low. Instead, due to the fact that the downlink parameter is selected depending on the uplink parameter of the new user equipment, this downlink parameter aims quite good into the direction of the new user equipment.

One of the advantages of this method is the fact that it does not require on-site intervention e.g. for calculating calibrations of the adaptive antenna. It is only necessary to select and fetch the stored downlink parameter in dependence of the uplink parameter.

Another advantageous embodiment of the invention comprises the step of a new pair of values of an uplink parameter and a corresponding downlink parameter to the stored corresponding values.

With this comparison, it is possible to detect e.g. if the calculated uplink parameter is only a local optimum but not an absolute optimum.

It is advantageous to update the stored downlink parameters by downlink parameters created by the further adaption.

Furthermore, it is advantageous if said uplink and said downlink parameter relate to the direction of the mobile user equipment in respect to the base station.

It is possible to store the corresponding uplink and downlink parameters in a list of the base station. As well, it is alternatively or additionally possible to create one or more equations between the uplink parameters and the downlink parameters and thereby store the relevant information in the base station.

The creation of the list does not require a lot of efforts. It is only necessary to built up the list with a number of corresponding uplink and downlink parameters. This list is then updated automatically with additional and/or optimized corresponding values. The same is valid for the at least one equation.

It is mentioned that the invention may not only used in connection with the base station of the telecommunication system, but also in connection with the mobile user equipment, in particular, if the mobile user equipment is combined with a mobile computer system, e.g. a notebook.

BRIEF DESCRIPTION OF THE DRAWING

Further embodiments and advantages of the invention are outlined in the following description of the drawings. The only FIGURE of the drawings shows a schematic block diagram of an embodiment of a method of transmitting signals between an adaptive antenna of a base station and a mobile user equipment in a telecommunication network according to the invention.

It is assumed that the base station and a specific user equipment are transmitting data in the uplink and in the downlink since some time. It is also assumed that—in connection with the downlink—the base station has adjusted the beam of the adaptive antenna into the direction of the specific user equipment by adjusting the phases of the signals sent out by the adaptive antenna. Furthermore, it is assumed that—in connection with the uplink—the base station has calculated those phases of the signals received from the specific user equipment relating to the direction of the specific user equipment in respect to the base station.

It is mentioned that it would also be possible to adjust or calculate not only the phases but the complex factor as described in connection with the prior art. In the above assumptions, however, only the phases are taken in order to simplify the described embodiment.

With these assumptions it is possible to store, for a specific location of the specific user equipment, the phases of the uplink calculated by the base station and the phases of the downlink adjusted by the base station. These phases of the uplink and the downlink are stored within the base station for example in a list. This list is indicated by the reference numeral 10 in the FIGURE. In the left column indicated with "UL", the phases of the uplink are stored, and in the right column indicated with "DL", the corresponding phases of the downlink are stored.

It is emphasized once more that the list 10 must not necessarily comprise only phases but it is also possible that it comprises other or additional parameters of the sent and received signal e.g. the amplitudes or the like.

As shown in the FIGURE, the list 10 does not only store the phases of the uplink and the downlink for one specific location of the specific user equipment but for a number of different locations of the specific user equipment.

If a new user equipment is turned on, the following method is carried out:

After the new user equipment is turned on, it sends data to the base station. From the signal received by the base station in the uplink, the base station calculates the phase of the received signal, i.e. the phase of the uplink.

Then, the base station fetches the corresponding phase of the downlink, i.e. that phase with which the signal to be sent out by the adaptive antenna of the base station has to be adjusted. This downlink phase is fetched from the list 10 depending on the calculated uplink phase as follows.

In the FIGURE, an arrow 11 indicates the incoming uplink phase calculated by the base station based on the signal received by the adaptive antenna. At the "start" of the new user equipment, this uplink phase is provided via a switch 12 to the list 10. The switch 12 shall indicate that the uplink phase is not provided to the list 10 anymore after the "start" of the new user equipment.

Then, depending on the incoming uplink phase, the corresponding downlink phase is read out of the list 10. This is shown in the FIGURE by the two arrows 13, 14 which shall indicate that the downlink phase is read out of the list 10 depending on the uplink phase. A switch 15 shall indicate again that the downlink phase is not read out from the list 10 anymore after the "start" of the new user equipment.

Summarized, the "start" of the new user equipment is carried out by using that downlink phase stored in the list 10 which corresponds to the uplink phase calculated from the uplink signal received by the base station after the "start" of the new user equipment.

The downlink phase read from the list 10, therefore, is used as a starting point for adjusting the signals sent by the adaptive antenna of the base station. This starting point is then used to optimize or to further adapt the downlink phases depending on a movement of the new user equipment. This optimization or adaption is indicated in the FIGURE by reference numeral 16.

As already described, EP 1 067 710 A1 may be used for the optimization or adaption 16.

The phases calculated by the optimization or adaption 16 are then forwarded to the adaptive antenna to create the signals sent by the adaptive antenna to the new user equipment. This is indicated by an arrow 17 in the FIGURE.

As well, these adopted phases are written into the list 10. This is shown in the FIGURE by the two arrows 18, 19 which shall indicate that the adapted phases are written into the list 10 depending on the corresponding uplink phases of the same point in time. By writing the adapted phases into the list 10, this list 10 is updated.

As a result, it is not necessary anymore to "start" the adjustment of the adaptive antenna of the base station with a very broad range of the used complex factors, i.e. of the used phases. Instead, it is possible to use a starting point for these phases read out from the list 10. Then, based on this starting point, the adoption of the adaptive antenna may be continued as described without the use of the list 10. However, the list 10 is updated in order to permanently optimize the corresponding uplink phases and the downlink phases stored in the list 10.

Independently from the above described method, the list 10 may further be used as follows:

A new pair of corresponding values of the uplink parameter and the downlink parameter are compared with those pairs of corresponding values stored in the list 10. Such comparison is carried out before updating the list with the new values.

If the comparison shows that the new pair of corresponding values of the uplink parameter and the downlink parameter are at least similar to a stored pair of corresponding values, then it is assumed that the new pair of corresponding values is correct. However, if the new pair of corresponding values is different from any stored pair of corresponding values, then it is assumed that there is a problem. Thereby, the comparison may be used e.g. for checking the correctness of the new pair of values or in particular the correctness of a calculated uplink parameter.

For example, it is possible that the uplink parameter calculated by the base station does not relate to the absolute optimum of the uplink signal but only to a local optimum. This problem is therefore detectable by comparing the new pair of corresponding values with the stored pairs of corresponding values.

The methods described above are based on the assumptions that the list 10 is actually present in the base station and that this list 10 comprises the phases of the uplink and the corresponding phases of the downlink for a number of different locations of a user equipment.

For creating the list 10, the following possibilities exist:

It is possible to calculate a number of the uplink and downlink phases based on a calibration of the signal paths of the adaptive antenna of the base station for the uplink and for the downlink. Such calculation has only to be carried out once. Then, according to the above described method, the contents of the list 10 is updated permanently and automatically.

Another possibility is to "start" the adaption of the adaptive antenna with a very broad range of the used phases. Then, the list 10 which might be empty at this "start", will be filled up with corresponding uplink and downlink phases. After some time, the list 10 will comprise a number of corresponding phases so that e.g. the "start" of any new user equipment may be carried out according to the described method.

Furthermore, it is possible to use both possibilities at the same time. For example, it is possible to "start" with an empty list 10 as described above and to create at least a small number of corresponding uplink and downlink phases. Based on this small number of values, further values of corresponding uplink and downlink phases may then be calculated under the consideration of the calibration of the adaptive antenna of the base station in the uplink and in the downlink and/or under the consideration of the already stored values of corresponding uplink and downlink phases.

The described possibilities are only relevant with regard to the creation of the list 10. As soon as the list 10 exists, these possibilities are not relevant anymore. This means that after the creation of the list 10, downlink phases for new user equipments may be read out of the list 10 depending on the uplink phases of the signals received from the new user equipments. These downlink phases may be used at once as starting points for adjusting the signals sent by the adaptive antenna of the base station to the new user equipments. As well, these uplink phases and the corresponding downlink phases may be compared for detecting e.g. local optimums instead of absolute optimums.

The invention claimed is:

1. A method of transmitting signals between an adaptive antenna of a base station and a mobile user equipment in a telecommunication network, comprising the steps of: calculating at least one uplink parameter of a signal received by the base station wherein the uplink parameter relates to a specific location of a first mobile user equipment, evaluating at least one downlink parameter of a signal sent by the base station wherein said downlink parameter relates to the same specific location of the first mobile user equipment, storing said uplink parameter and said corresponding downlink parameter in the base station, and subsequently selecting said stored downlink parameter depending on an uplink parameter calculated from the signal received from a new mobile user equipment different from said first mobile user equipment.

2. The method of claim 1, further comprising the step of: using the selected downlink parameter as a staffing point for a further her adaption of the selected downlink parameter.

3. The method of claim 1, comprising the step of: comparing a new pair of values of an uplink parameter and a corresponding downlink parameter to the stored corresponding values.

4. The method of claim 1, comprising the step of updating the stored downlink parameters by downlink parameters created by the further adaption.

5. The method of claim 1 wherein said uplink and said downlink parameter relate to the direction of the mobile user equipment in respect to the base station.

6. The method of claim 1 wherein corresponding uplink and downlink parameters for different locations of the user equipment are stored in a list of the base station.

7. The method of claim 1 wherein the uplink and downlink parameters are stored as at least one equation.

8. A telecommunication system for transmitting signals between an adaptive antenna of a base station and a mobile user equipment, said system including a parameter evaluation component which calculates at least one uplink parameter of a signal received by the base station from a first mobile equipment, wherein the uplink parameter relates to a specific location of the mobile user equipment, and which evaluates at least one downlink parameter of a signal sent by the base station, wherein said downlink parameter relates to the same specific location of the mobile user equipment, said system farther including a parameter storage in said base station which stores said uplink parameter and said corresponding downlink parameter the system further including a parameter selection component which selects said stored downlink parameter depending on an uplink parameter calculated from a signal received from a new mobile user equipment different from said first mobile user equipment.

9. A base station for a telecommunication system for transmitting signals between an adaptive antenna of the base station and a mobile user equipment, said base station including a parameter evaluation component which calculates at least one uplink parameter of a signal received by the base station from a first mobile equipment, wherein the uplink parameter relates to a specific location of the mobile user equipment, and which evaluates at least one downlink parameter of a signal sent by the base station, wherein said downlink parameter relates to the same specific location of the mobile user equipment, said base station further including a parameter storage which stores said uplink parameter and said corresponding downlink parameter, said base station further including a parameter selection component which selects said stored downlink parameter depending on an uplink parameter calculated from the signal received from a new mobile user equipment different from said first mobile user equipment.

* * * * *